(12) United States Patent
Kamiya et al.

(10) Patent No.: US 8,798,870 B2
(45) Date of Patent: Aug. 5, 2014

(54) REGENERATION CONTROL DEVICE FOR VEHICLE

(75) Inventors: Kohei Kamiya, Zama (JP); Shusaku Katakura, Fujisawa (JP); Kenichiro Murakami, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/976,607

(22) PCT Filed: Dec. 26, 2011

(86) PCT No.: PCT/JP2011/080049
§ 371 (c)(1),
(2), (4) Date: Jun. 27, 2013

(87) PCT Pub. No.: WO2012/090924
PCT Pub. Date: Jul. 5, 2012

(65) Prior Publication Data
US 2013/0289830 A1    Oct. 31, 2013

(30) Foreign Application Priority Data
Dec. 28, 2010 (JP) .................... 2010-293077

(51) Int. Cl.
*B60W 30/18* (2012.01)
(52) U.S. Cl.
CPC ......... *B60W 30/18* (2013.01); *B60W 30/18072* (2013.01)
USPC .......................................................... 701/48
(58) Field of Classification Search
CPC B60W 30/18; B60W 30/18072; B60W 10/50
USPC ............................................................ 701/48
See application file for complete search history.

(56) References Cited

U.S. PATENT DOCUMENTS

| | | | |
|---|---|---|---|
| 6,847,189 B2 * | 1/2005 | Frank | 320/104 |
| 2002/0094899 A1 * | 7/2002 | Hamai | 475/5 |
| 2002/0173391 A1 * | 11/2002 | Endo et al. | 474/18 |
| 2008/0208422 A1 * | 8/2008 | Shibata et al. | 701/54 |
| 2010/0151988 A1 * | 6/2010 | Tabata et al. | 477/3 |
| 2010/0250075 A1 * | 9/2010 | Suzuki et al. | 701/55 |

FOREIGN PATENT DOCUMENTS

| | | |
|---|---|---|
| JP | 11-107805 A | 4/1999 |
| JP | 2006-325293 A | 11/2006 |
| JP | 2008-114709 A | 5/2008 |
| JP | 2010-120503 A | 6/2010 |

* cited by examiner

*Primary Examiner* — Thomas Tarcza
*Assistant Examiner* — Alex C Dunn
(74) *Attorney, Agent, or Firm* — Foley & Lardner LLP (57) ABSTRACT

A regeneration control device for vehicle including a generator for generating power by being driven by an engine and configured to convert kinetic energy of a vehicle into electrical energy by the generator includes a generated voltage control unit configured to variably control a generated voltage of the generator, a road traffic environment detection unit configured to detect a road traffic environment, a recommended deceleration calculation unit configured to calculate a recommended deceleration during coasting depending on the road traffic environment, and a regeneration control unit configured to convert the kinetic energy of the vehicle into the electrical energy by increasing the generated voltage of the generator as the recommended deceleration increases.

5 Claims, 7 Drawing Sheets

REGENERATION CONTROL DEVICE FOR VEHICLE

FIELD OF THE INVENTION

The present invention relates to a regeneration control device for vehicle.

BACKGROUND

A regeneration control device for vehicle disclosed in JP2006-325293A executes a regeneration control for intensively charging a battery by increasing a generated voltage of a generator when the supply of fuel to an engine is stopped during coasting. At this time, the generated voltage of the generator is controlled so as not to exceed a deceleration at which a driver feels a sense of incongruity during coasting.

SUMMARY OF INVENTION

The deceleration at which the driver feels a sense of incongruity during coasting varies depending on a road traffic environment in which a vehicle is running such as, for example, when a traffic intersection is present in front, and there are scenes where the driver does not feel a sense of incongruity even if the conventionally set deceleration is exceeded. However, such scenes cannot be sorted out in the conventional regeneration control device for vehicle. Thus, the generated voltage of the generator cannot be set high in scenes where it can be further increased, wherefore there has been a problem that charging efficiency is poor.

The present invention was developed in view of such a problem and aims to improve charging efficiency at the time of a regeneration control.

According to a certain aspect of the present invention, a regeneration control device for vehicle is provided which variably controls a generated voltage of a generator for generating power by being driven by an engine, detects a road traffic environment, calculates a recommended deceleration during coasting depending on the road traffic environment and converts kinetic energy of a vehicle into electrical energy by increasing the generated voltage of the generator as the recommended deceleration increases.

An embodiment and advantages of the present invention are described in detail below with reference to the accompanying drawings.

DETAILED DESCRIPTION

Figure 1:
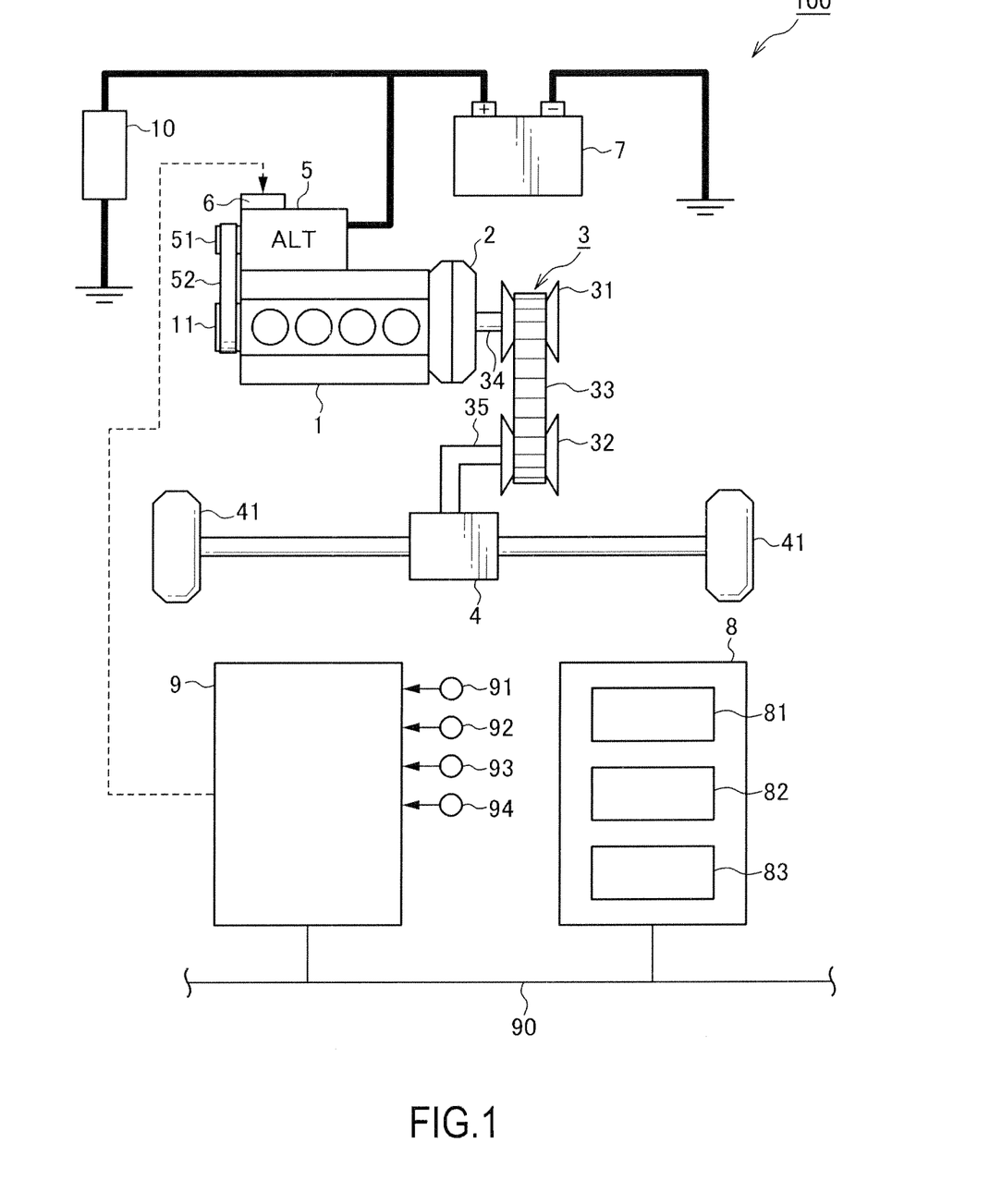
FIG. 1 is a schematic configuration diagram of a regeneration control device for vehicle according to one embodiment of the present invention.

FIG. 1 is a schematic configuration diagram of a regeneration control device 100 for vehicle according to one embodiment of the present invention.

The regeneration control device 100 for vehicle includes an engine 1, a torque converter 2, a continuously variable transmission 3, a final speed reducer 4, an alternator 5, a voltage regulator 6, a battery 7, a navigation device 8 and a controller 9.

The engine 1 generates a drive force for driving the vehicle.

The torque converter 2 transmits the drive force of the engine 1 to an input shaft 34 of the continuously variable transmission 3 via fluid.

The continuously variable transmission 3 is a transmission capable of continuously varying a speed ratio and includes a drive-side pulley 31, a driven-side pulley 32, a V-belt 33 for transmitting a rotational force of the drive-side pulley 31 to the driven-side pulley 32, and the like. The continuously variable transmission 3 increases or decreases the drive force transmitted to the input shaft 34 according to the speed ratio and outputs it to an output shaft 35. It should be noted that the "speed ratio" is a value obtained by dividing a rotation speed of the input shaft 34 of the continuously variable transmission 3 by that of the output shaft 35. Further, in the following description, a "lowest speed ratio" means a maximum speed ratio of the continuously variable transmission 3 and a "highest speed ratio" means a minimum speed ratio of the continuously variable transmission 3.

The final speed reducer 4 increases the drive force increased or decreased by the continuously variable transmission 3, transmits it to left and right drive wheels 41 and absorbs a rotation speed difference of the left and right drive wheels 41.

The alternator 5 generates power by being driven by the engine 1. The alternator 5 is coupled to a crank pulley 11 of the engine 1 by a belt 52 via an alternator drive pulley 51 provided on one end part. The alternator 5 has a load respond control (LRC) for gradually increasing the amount of power generation, for example, when an engine rotation speed is not higher than a predetermined rotation speed such as during idling to prevent a sudden reduction in the engine rotation speed and an occurrence of engine stall by driving the alternator 5. The engine rotation speed at which this load respond control operates is referred to as an "LRC operating rotation speed" below.

The voltage regulator 6 is built in the alternator 5 and controls a generated voltage of the alternator 5 to a predetermined target generated voltage. The voltage regulator 6 increases the generated voltage by increasing a field current if the generated voltage of the alternator 5 is lower than the target generated voltage and decreases the generated voltage by decreasing the field current if the generated voltage of the alternator 5 is higher than the target generated voltage.

The battery 7 stores electricity and supplies the stored electricity to various electrical loads 10 of the vehicle such as headlights and a blower fan for air conditioning according to needs. A positive terminal of the battery 7 is connected to the alternator 5 and the electrical loads 10 and a negative terminal is grounded.

The navigation device 8 includes a vehicle position detection unit 81, a storage unit 82 and a communication unit 83 and detects an environment of a road on which the vehicle is running (hereinafter, referred to as a "road traffic environment").

The vehicle position detection unit 81 receives radio waves from a GPS satellite by a UPS (Global Positioning System) sensor and detects a vehicle position. Further, a running direction and an altitude of the vehicle are calculated based on a detection value of a 3D gyro sensor.

The storage unit 82 stores map information such as roads and facilities on roads. More specifically, the storage unit 82 stores information such as widths and the numbers of lanes of roads, speed limits, the presence or absence of traffic lights and railroad crossings, radii of curvature of curves, traffic intersections and toll stations.

The communication unit 83 receives traffic jam information transmitted from a road traffic information communication system center by a receiver.

The controller 9 is configured by a microcomputer including a central processing unit (CPU), a read-only memory (ROM), a random access memory (RAM) and an input/output interface (I/O interface). A signal from an inter-vehicle distance sensor 91 for detecting an inter-vehicle distance between this vehicle and a vehicle running ahead by irradiating millimeter waves forward of this vehicle and receiving the millimeter waves reflected from the vehicle running ahead is input to the controller 9. Further, a signal from an SOC sensor 92 for detecting a state of charge SOC of the battery 7 is input to the controller 9. Besides these, signals from various sensors for detecting an operating state of the engine 1 such as an accelerator stroke sensor 93 for detecting the amount of depression of an accelerator pedal (hereinafter, referred to as an "accelerator operated amount") and a vehicle speed sensor 94 for detecting a vehicle speed are input to the controller 9. The navigation device 8 and the controller 9 are connected to a CAN (Controller Area Network) communication line 90 and can transmit and receive data to and from each other by CAN communication.

The controller 9 sets a target generated voltage of the alternator 5 according to the operating state of the engine 1, converts the set target generated voltage into a power generation command value and outputs it to the voltage regulator 6. In this embodiment, a regeneration control for setting a high target generated voltage and intensively generating power is executed when the accelerator pedal is not depressed, the vehicle is coasting to inertially drive and in a fuel cut mode in which the supply of fuel to the engine 1 is stopped. In this way, fuel economy is improved by decreasing a power generation frequency when the vehicle normally runs and a fuel cut is not performed.

The higher the target generated voltage of the alternator 5, the larger a load applied to the engine 1 to drive the alternator 5 and the larger the deceleration of the vehicle at the time of power generation. Thus, if the target generated voltage is set too high, the deceleration becomes too large and the driver may feel a sense of incongruity during coasting.

Accordingly, in this embodiment, a maximum deceleration at which a driver does not feel a sense of incongruity during coasting is set as a normal permissible deceleration Gt2 according to the vehicle speed in advance by an experiment or the like and the target generated voltage is basically so set as not to exceed that normal permissible deceleration Gt2 when the regeneration control is executed.

However, this normal permissible deceleration Gt2 is a deceleration at which a driver feels a sense of incongruity during coasting on a straight flat road (hereinafter, referred to as "during normal coasting"). Thus, when the vehicle runs on an actual market, there are scenes where the driver does not feel a sense of incongruity during coasting even if the deceleration exceeds the permissible deceleration Gt2, depending on a road traffic environment, for example, such as when a corner, a traffic intersection or a toll station is present ahead or the vehicle is running downhill.

Conversely, there are also scenes where it is desired to run a longer distance by coasting depending on a road traffic environment. If the regeneration control is executed in such scenes, the deceleration increases and a distance desired by the driver cannot be achieved and the accelerator pedal may be depressed. Then, fuel economy may be rather deteriorated by performing the regeneration control.

As just described, the deceleration required by the driver changes depending on the road traffic environment. Accordingly, in this embodiment, a power generation frequency and a power generation amount are ensured and fuel economy is improved by performing a proper regeneration control depending on the road traffic environment. The regeneration control according to this embodiment is described below with reference to FIGS. 2 to 7.

Figure 2:
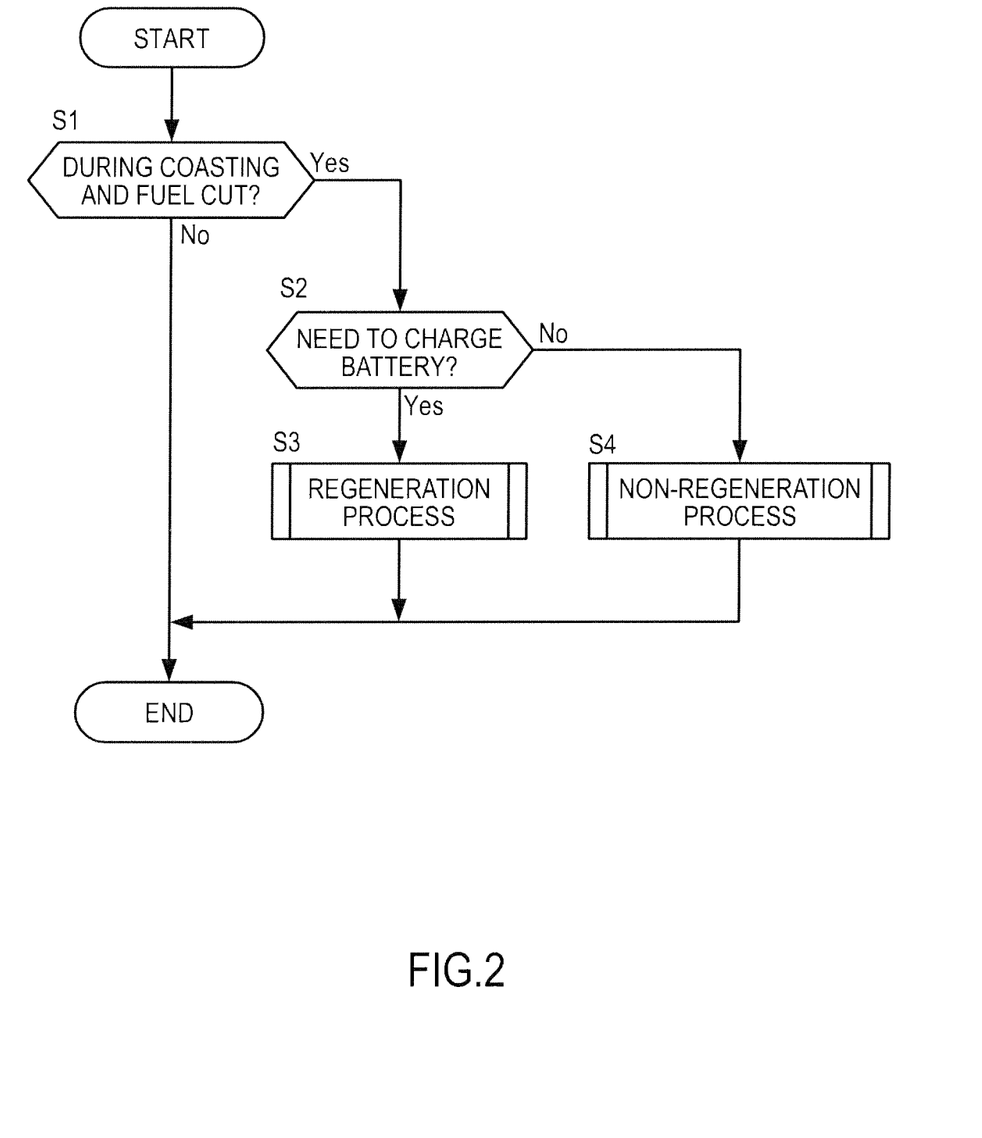
FIG. 2 is a flow chart showing a regeneration control according to one embodiment of the present invention.

FIG. 2 is a flow chart showing the regeneration control according to this embodiment. The controller 9 performs this routine in a predetermined operation cycle (e.g. 10 [ms]).

In Step S1, the controller 9 determines whether or not the vehicle is coasting and the fuel cut is performed. The controller 9 performs a processing of Step S2 if the vehicle is coasting and the fuel cut is performed and finishes the process this time unless otherwise.

In Step S2, the controller 9 determines whether or not the battery 7 needs to be charged. Specifically, whether or not the SOC is not larger than a predetermined value is determined. If the SOC is not larger than the predetermined value, the controller 9 performs a processing of Step S3, assuming that a regeneration execution condition is satisfied. On the other hand, if the SOC is larger than the predetermined value, a processing of Step S4 is performed, assuming that the regeneration execution condition is not satisfied.

In Step S3, the controller 9 performs the regeneration control. The regeneration control is described later with reference to FIG. 3.

In Step S4, the controller 9 performs a non-regeneration process. The non-regeneration process is described with reference to FIG. 7.

Figure 3:
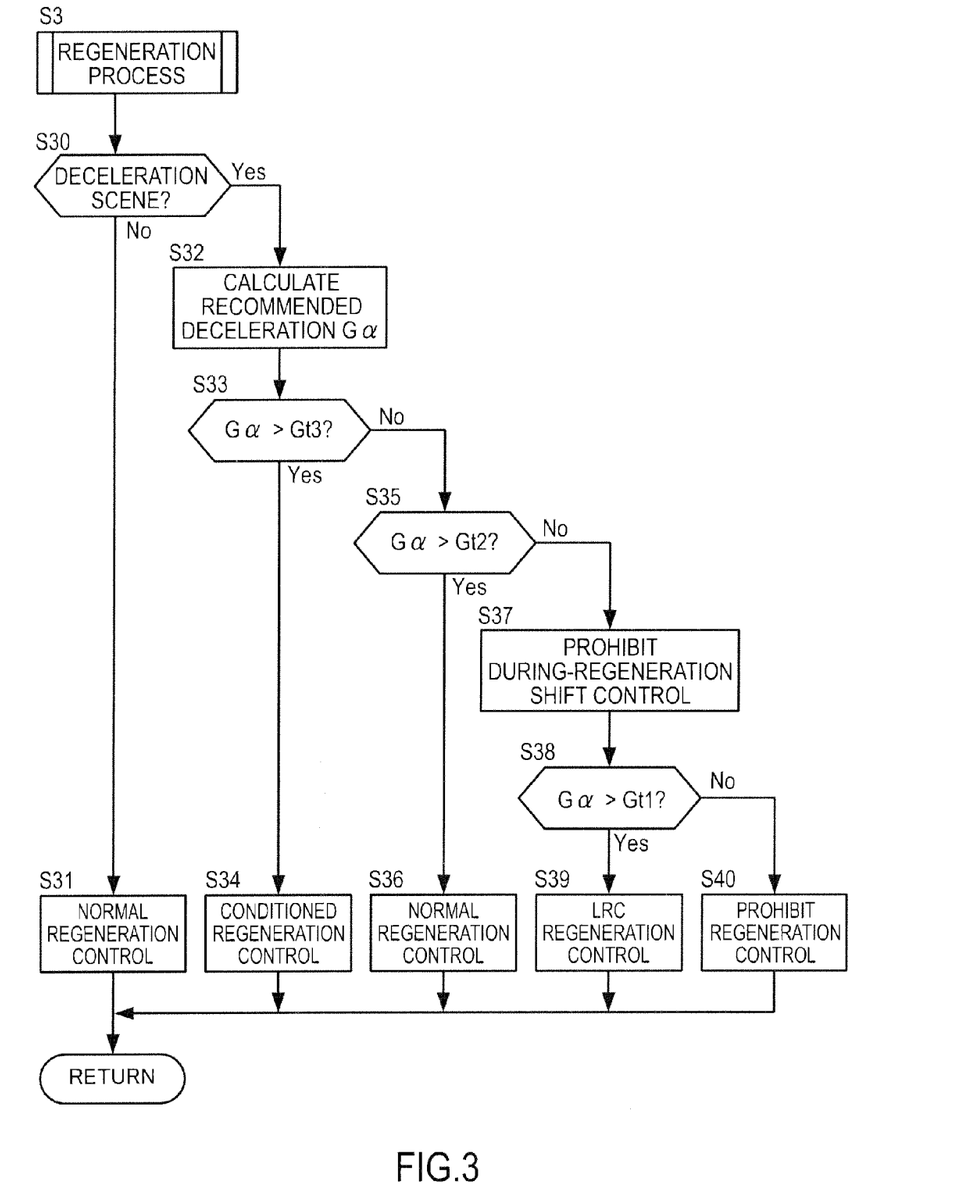
FIG. 3 is a flow chart showing a regeneration process.

FIG. 3 is a flow chart showing the regeneration process.

In Step S30, the controller 9 determines the presence or absence of a deceleration scene based on the road traffic environment. The controller 9 performs a processing of Step S31 unless the deceleration scene is present. On the other hand, a processing of Step S32 is performed if the deceleration scene is present.

A deceleration scene means a scene where deceleration is thought to be necessary before a corner, a traffic intersection, a toll station and the like, a scene where deceleration is thought to be necessary since a speed limit of a road ahead is lower than that of a road on which the vehicle is currently running, a scene where deceleration is thought to be necessary since the vehicle is getting closer to a vehicle ahead, a scene where deceleration is thought to be necessary since the vehicle is running downhill and the like.

In Step S31, the controller 9 performs a normal regeneration control, assuming no deceleration scene, i.e. the vehicle is normally coasting.

Figure 4:
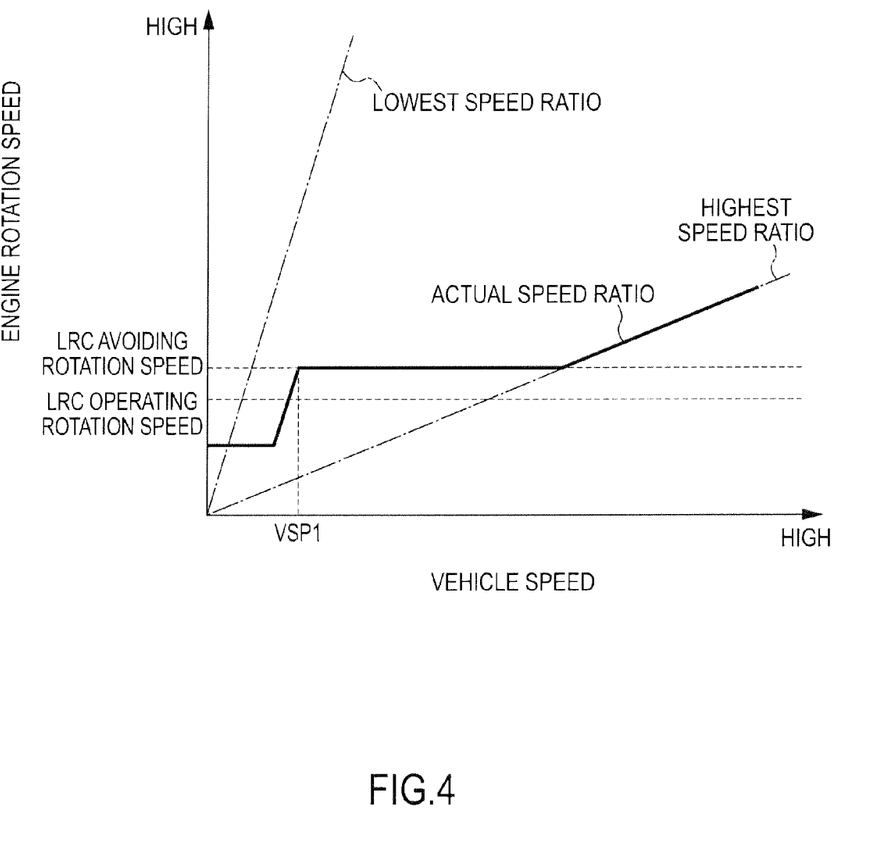
FIG. 4 is a graph showing a during-regeneration shift control.

As shown in FIG. 4, the controller 9 controls the speed ratio of the continuously variable transmission 3 to the highest speed ratio during the normal regeneration control and controls the speed ratio of the continuously variable transmission 3 toward a lower side from the highest speed ratio until the vehicle speed reaches a predetermined vehicle speed VSP1 and maintains the engine rotation speed at an LRC avoiding rotation speed when the engine rotation speed is reduced to the LRC avoiding rotation speed (=LRC operating rotation speed+about 100 [rpm] to 300 [rpm]) according to a reduction in the vehicle speed. Hereinafter, this control is referred to as a "during-regeneration shift control". In consideration of the deceleration determined according to the speed ratio of the continuously variable transmission 3, the target generated voltage of the alternator 5 is so set that the deceleration of the entire vehicle becomes the normal permissible deceleration Gt2 and that set target generated voltage is converted into a power generation command value and output to the voltage regulator 6.

The engine rotation speed is maintained at the LRC avoiding rotation speed so as not to fall below the LRC avoiding rotation speed in this way until the vehicle speed reaches the predetermined vehicle speed VSP1 because the load respond control of the alternator 5 operates and the amount of power generation is reduced as compared with the case where the load respond control is not in operation if the regeneration control is executed when the engine rotation speed is not higher than the LRC operating rotation speed.

This point is described with reference to FIG. 5.

Figure 5:
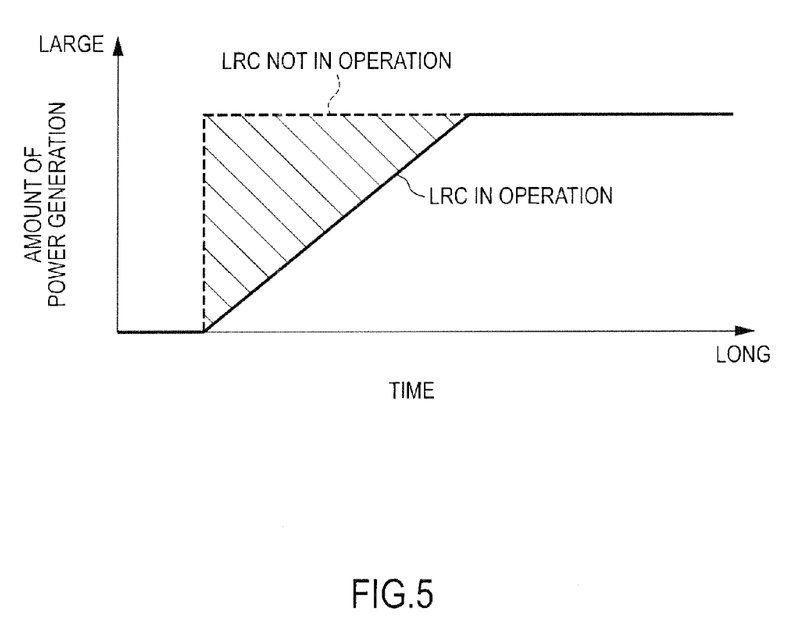
FIG. 5 is a graph showing a difference in power generation when a load respond control of an alternator is in operation and when it is not in operation.

FIG. 5 is a graph showing a difference in the amount of power generation when the load respond control of the alternator 5 is in operation and when it is not in operation.

As shown by solid line in FIG. 5, if the regeneration control is executed when the engine rotation speed is not higher than the LRC operating rotation speed, the target generated voltage of the alternator 5 is gradually increased to gradually increase the amount of power generation. In this way, a sudden fall in the engine rotation speed is suppressed and the occurrence of engine stall is prevented.

On the other hand, as shown by broken line in FIG. 5, if the regeneration control is executed when the engine rotation speed is higher than the LRC operating rotation speed, the target generated voltage of the alternator 5 is increased at once to increase the amount of power generation at once. This is because it is not necessary to concern about engine stall if the engine rotation speed is higher than LRC operating rotation speed.

Thus, the amount of power generation is reduced by as much as a hatched part in FIG. 5 when the load respond control is operated.

Referring back to FIG. 3 again, various regeneration controls corresponding to deceleration scenes are executed in Steps S32 to S39.

In Step S32, the controller 9 calculates a recommended deceleration $G\alpha$ corresponding to the deceleration scene. The recommended deceleration $G\alpha$ is calculated as follows.

For example, if there is a corner ahead, a recommended vehicle speed during cornering is first calculated based on a radius of curvature of the corner. Then, a deceleration necessary to reduce the current vehicle speed to the recommended vehicle speed when the vehicle enters the corner is calculated based on the recommended vehicle speed, the current vehicle speed and a distance to the corner, and that deceleration is set as the recommended deceleration $G\alpha$.

Further, if there is a traffic intersection or a toll station ahead, a recommended vehicle speed when the vehicle passes the traffic intersection or the toll station is first calculated. Then, a deceleration necessary to reduce the current vehicle speed to the recommended vehicle speed when the vehicle passes the traffic intersection or the toll station is calculated based on the recommended vehicle speed, the current vehicle speed and a distance to the traffic intersection or the toll station, and that deceleration is set at the recommended deceleration $G\alpha$.

Further, if there is a vehicle ahead, a deceleration necessary to set an inter-vehicle distance to the vehicle ahead at a proper distance according to a relative speed of the vehicle ahead and this vehicle is calculated as the recommended deceleration $G\alpha$.

Further, if the vehicle is running downhill, the recommended deceleration $G\alpha$ is calculated based on an acceleration during running.

In Step S33, the controller 9 determines the presence or absence of a deceleration scene where the driver does not feel a sense of incongruity during coasting even if the deceleration exceeds the normal permissible deceleration Gt2, i.e. a deceleration scene where a deceleration at which the driver feels a sense of incongruity is larger than during normal coasting (hereinafter, referred to as a "conditioned deceleration scene") based on the recommended deceleration $G\alpha$. Specifically, whether or not the recommended deceleration $G\alpha$ is larger than a conditioned permissible deceleration Gt3 is determined.

The conditioned permissible deceleration Gt3 is a maximum deceleration permissible in the conditioned deceleration scene, i.e. a maximum deceleration at which the driver does not feel a sense of incongruity in the conditioned deceleration scene. The conditioned permissible deceleration Gt3 is set by an experiment or the like in advance according to the vehicle speed. The conditioned permissible deceleration Gt3 is set to increase as the vehicle speed increases and larger than the normal permissible deceleration Gt2 in the entire vehicle range. The controller 9 performs a processing of Step S34 to set a higher target generated voltage than during the normal regeneration control if the recommended deceleration $G\alpha$ is larger than the conditioned permissible deceleration Gt3. On the other hand, a processing of Step S35 is performed if the recommended deceleration $G\alpha$ is not larger than the conditioned permissible deceleration Gt3.

In Step S34, the controller 9 performs a regeneration control in the conditioned deceleration scene (hereinafter, referred to as a "condition regeneration control").

Also during the conditioned regeneration control, the controller 9 performs the during-regeneration shift control as during the normal regeneration control. Then, in consideration of the deceleration determined according to the speed ratio of the continuously variable transmission 3, the target generated voltage of the alternator 5 is set to be higher than during the normal regeneration control so that the deceleration of the entire vehicle becomes the conditioned permissible deceleration Gt3 and that set target generated voltage is converted into a power generation command value and output to the voltage regulator 6.

In Step S35, the controller 9 determines whether or not to perform the normal regeneration control based on the recommended deceleration $G\alpha$. Specifically, whether or not the recommended deceleration $G\alpha$ is larger than the normal permissible deceleration Gt2 is determined.

Such a determination is made for the following reason. There is no problem to perform the normal regeneration control and set the target generated voltage of the alternator 5 so that the deceleration becomes the normal permissible deceleration Gt2 if the recommended deceleration $G\alpha$ is larger than the normal permissible deceleration Gt2. However, if the normal regeneration control is executed and the target generated voltage of the alternator 5 is so set that the deceleration becomes the normal permissible deceleration Gt2 when the recommended deceleration $G\alpha$ is not larger than the normal permissible deceleration Gt2, the following problem occurs.

Specifically, the recommended deceleration $G\alpha$ is not larger than the normal permissible deceleration Gt2, for example, when a distance to a corner present ahead is relatively long or when a relative speed difference from a vehicle ahead is small. Thus, if the target generated voltage of the alternator 5 is so set that the deceleration becomes the normal permissible deceleration Gt2 in such a scene, the speed may fall to or below the recommended vehicle speed before the vehicle enters the corner and the driver may depress the accelerator pedal before entering the corner. Further, the relative speed difference from the vehicle ahead may become larger to extend an inter-vehicle distance to the vehicle ahead and the driver may depress the accelerator pedal to follow the vehicle ahead. As a result, a problem of rather deteriorating fuel economy occurs as described above.

Accordingly, the controller 9 performs a processing of Step S36 to perform the normal regeneration control if the recommended deceleration Gα is larger than the normal permissible deceleration Gt2. On the other hand, if the recommended deceleration Gα is not larger than the normal permissible deceleration Gt2, a processing of Step S37 is performed, taking into account a possibility that the accelerator pedal is depressed if the normal regeneration control is executed.

In Step S36, the controller 9 performs the normal regeneration control.

Figure 6:
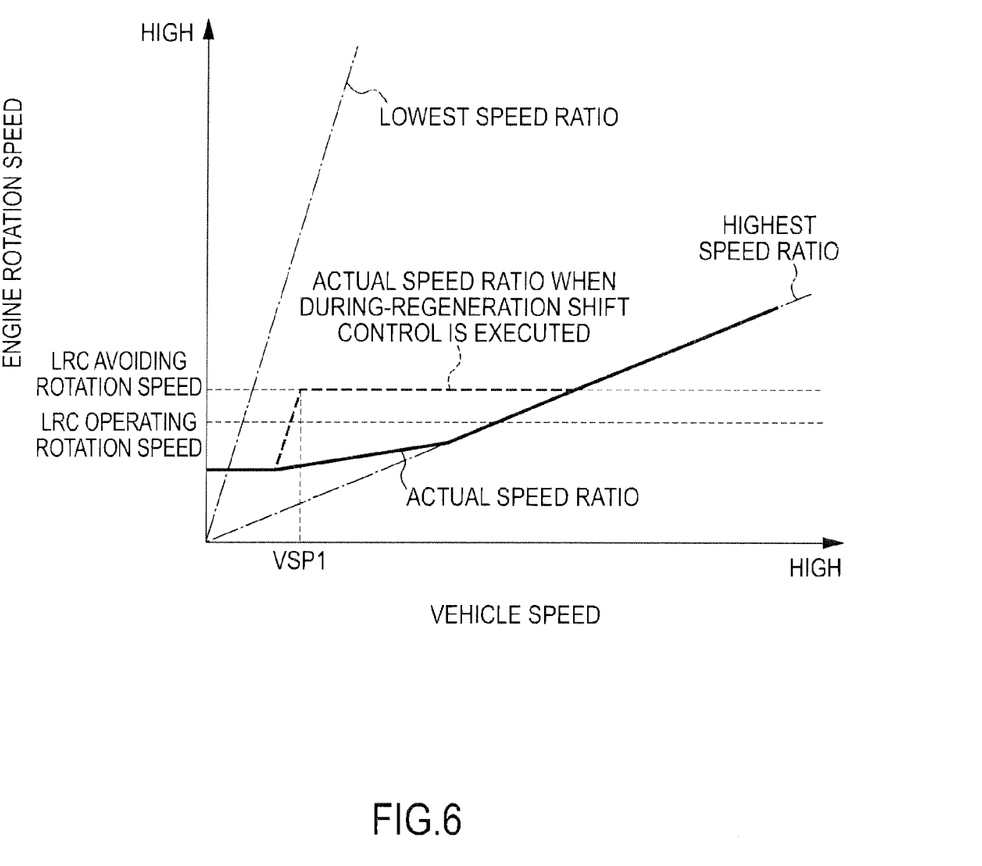
FIG. 6 is a graph showing a case where the during-regeneration shift control is not executed.

In Step S37, the controller 9 prohibits the during-regeneration shift control executed during the normal regeneration control and during the conditioned regeneration control and, as shown in FIG. 6, maintains the speed ratio of the continuously variable transmission 3 at the highest speed ratio even if the engine rotation speed is reduced to the LRC avoiding rotation speed and reduces the engine rotation speed to or below the LRC operating rotation speed.

This is because a scene where it is desired to run a longer distance by coasting is conceivable when the recommended deceleration Gα is not larger than the normal permissible deceleration Gt2. However, if the speed ratio of the continuously variable transmission 3 is controlled toward the lower side from the highest speed ratio to maintain the engine rotation speed at the LRC avoiding rotation speed, the deceleration is increased by that much and a coasting distance becomes shorter.

In Step S38, the controller 9 determines whether or not to perform the regeneration control based on the recommended deceleration Gα. Specifically, whether or not the recommended deceleration Gα is larger than a regeneration prohibiting deceleration Gt1 is determined. The regeneration prohibiting deceleration Gt1 is set by an experiment or the like in advance according to the vehicle speed. The regeneration prohibiting deceleration Gt1 is set to increase as the vehicle speed increases and smaller than the normal permissible deceleration Gt2 in the entire vehicle speed range. The controller 9 performs a processing of Step S39 if the recommended deceleration Gα is larger than the regeneration prohibiting deceleration Gt1. On the other hand, a processing of Step S40 is performed if the recommended deceleration Gα is not larger than the regeneration prohibiting deceleration Gt1.

Such a determination is made for the following reason. Even if the recommended deceleration Gα is not larger than the normal permissible deceleration Gt2 and it is desired to run a longer distance by coasting, there are a case where the execution of the regeneration control to gradually increase the deceleration by operating the load respond control in an LRC operating region (region where the engine rotation speed is not higher than the LRC operating rotation speed) is suitable for the current driving scene and a case where the non-execution of the regeneration control is suitable for the current driving scene. Accordingly, in this embodiment, the regeneration prohibiting deceleration Gt1 is set as a boundary and a regeneration control in which the load respond control is operated in the LRC operating region (hereinafter, referred to as an "LRC regeneration control") is executed if the recommended deceleration Gα is larger than the regeneration prohibiting deceleration G0 and the regeneration control itself is prohibited if the recommended deceleration Gα is smaller than the regeneration prohibiting deceleration Gt1.

In Step S39, the controller 9 executes the LRC regeneration control.

In Step S40, the controller 9 prohibits the execution of the various regeneration controls described above.

Figure 7:
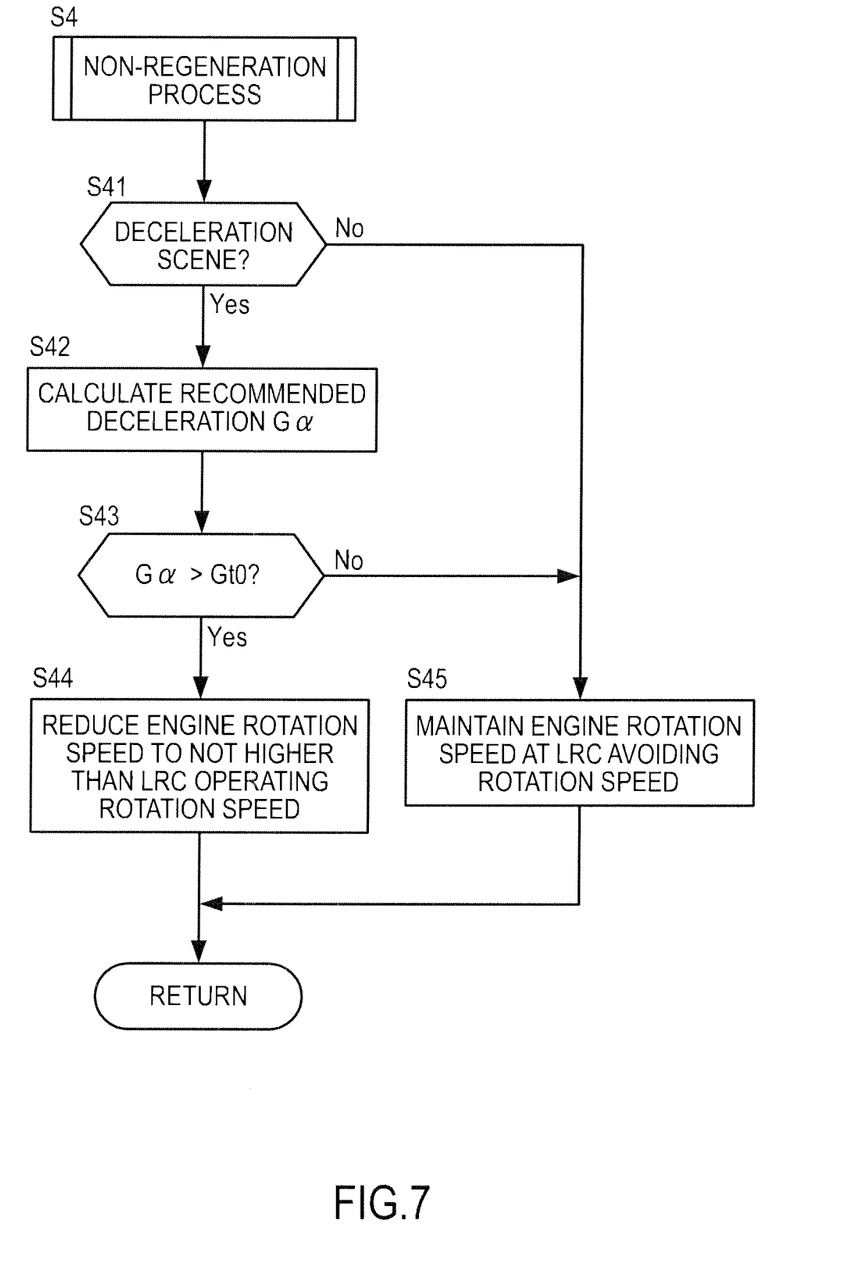
FIG. 7 is a flow chart showing a non-regeneration process.

FIG. 7 is a flow chart showing the non-regeneration process.

In Step S41, the controller 9 determines the presence or absence of a deceleration scene based on the road traffic environment as in Step S30. The controller 9 performs a processing of Step S45 unless the deceleration scene is present. On the other hand, a processing of Step S42 is performed if the deceleration scene is present.

In Step 42, the controller 9 calculates a recommended deceleration Gα corresponding to the deceleration scene as in Step S32.

In Step S43, the controller 9 determines whether or not the recommended deceleration Gα is larger than an LRC avoiding deceleration Gt0. The deceleration Gt0 is used to determine whether or not to control the speed ratio of the continuously variable transmission 3 toward the lowest speed ratio to maintain the LRC avoiding rotation speed when the engine rotation speed is reduced to the LRC avoiding rotation speed during the non-regeneration process. The controller 9 performs a processing of Step S44 if the recommended deceleration Gα is larger than the LRC avoiding deceleration Gt0. On the other hand, a processing of Step S45 is performed if the recommended deceleration Gα is not larger than the LRC avoiding deceleration Gt0.

In Step S44, the controller 9 maintains the speed ratio of the continuously variable transmission 3 at the highest speed ratio even if the engine rotation speed is reduce to the LRC avoiding rotation speed, and reduces the engine rotation speed to or below the LRC operating rotation speed.

In Step S45, the controller 9 controls the speed ratio of the continuously variable transmission 3 to the highest speed ratio and controls the speed ratio of the continuously variable transmission 3 toward the lower side from the highest speed ratio until the vehicle speed reaches the predetermined vehicle speed VSP1 and maintains the engine rotation speed at the LRC avoiding rotation speed when the engine rotation speed is reduced to the LRC avoiding rotation speed according to a reduction in the vehicle speed.

According to this embodiment described above, considering that the deceleration required by the driver changes depending on the road traffic environment, the recommended deceleration Gα corresponding to the road traffic environment is calculated and whether any one of the conditioned regeneration control, the normal regeneration control and the LRC regeneration control is to be executed or the regeneration control itself is to be prohibited is determined based on the recommended deceleration Gα.

Specifically, if the recommended deceleration Gα is larger than the conditioned permissible deceleration Gt3, i.e. in the deceleration scene where the deceleration at which the driver feels a sense of incongruity is larger than during normal coasting (conditioned deceleration scene), the conditioned regeneration control is executed. During the conditioned regeneration control, the target generated voltage of the alternator 5 is set to be higher than during the normal regeneration control executed during normal coasting.

In this way, the deceleration suitable for the conditioned deceleration scene and larger than during normal coasting can be generated, charging efficiency can be improved and fuel economy can be improved since the amount of power generation is also increased.

Further, since the during-regeneration shift control for maintaining the engine rotation speed at the LRC avoiding rotation speed is also executed during the conditioned regeneration control, a reduction in the amount of power generation caused by the operation of the load respond control can be prevented.

Further, the LRC regeneration control is performed when the recommended deceleration Gα is not larger than the normal permissible deceleration Gt2 and is larger than the regeneration prohibiting deceleration Gt1, i.e. when the vehicle is in a deceleration scene where it is desired to run a longer distance by coasting, but it is better to gradually increase the deceleration by operating the load respond control in the LRC operating region.

Since the engine rotation speed is reduced to or below the LRC operating rotation speed with the speed ratio of the continuously variable transmission 3 maintained at the highest speed ratio during the LRC regeneration control, it is possible to run a longer distance by coasting. Thus, the accelerator pedal is not unnecessarily depressed during coasting, wherefore fuel economy can be improved.

Since the load respond control is operated to gradually increase the deceleration in the LRC operating region so that the deceleration of the entire vehicle becomes the regeneration prohibiting deceleration Gt1, an appropriate deceleration can be generated and fuel economy can be improved by improving charging efficiency.

Further, when the recommended deceleration Gα is not larger than the regeneration prohibiting deceleration Gt1 during the regeneration process and when the recommended deceleration Gα is not larger than the LRC avoiding deceleration Gt0 during the non-regeneration process, the engine rotation speed is reduced to or below the LRC operating rotation speed and the regeneration control itself is prohibited with the speed ratio of the continuously variable transmission 3 maintained at the highest speed ratio. Thus, a longer distance can be achieved by coating and the accelerator pedal is not unnecessarily depressed during coasting, wherefore fuel economy can be improved.

Although this invention has been described by way of the specific embodiment above, this invention is not limited to the above embodiment. It is possible for a person skilled in the art to modify or alter the above embodiment in various manners within the technical scope of the present invention.

For the above description, the contents of Japanese Patent Application No. 2010-293077 filed on Dec. 28, 2010 are hereby incorporated by reference.

The invention claimed is:

1. A regeneration control device for vehicle including:
   a generator to be driven by an engine, and
   a continuously variable transmission capable of continuously varying a speed ratio, and configured to convert kinetic energy of a vehicle into electrical energy by the generator, comprising:
   a generated voltage control unit configured to variably control a generated voltage of the generator;
   a road traffic environment detection unit configured to detect a road traffic environment;
   a recommended deceleration calculation unit configured to calculate a recommended deceleration during coasting depending on the road traffic environment; and
   a regeneration control unit configured to convert the kinetic energy of the vehicle into the electrical energy by increasing the generated voltage of the generator as the recommended deceleration increases;
   wherein the regeneration control unit operates a load response control for gradually increasing the generated voltage of the generator when an engine rotation speed is not higher than a predetermined rotation speed if the recommended deceleration is not larger than a normal permissible deceleration normally permitted during coasting and maintains the engine rotation speed at a rotation speed higher than the predetermined rotation speed by increasing the speed ratio of the continuously variable transmission so that the load response control function does not operate when the recommended deceleration is larger than the normal permissible deceleration.

2. The regeneration control device for the vehicle according to claim 1, wherein the regeneration control unit:
   converts the kinetic energy of the vehicle into the electrical energy by increasing the generated voltage of the generator even if the deceleration of the vehicle exceeds the normal permissible deceleration when the recommended deceleration is in excess of a predetermined conditioned permissible deceleration larger than the normal permissible deceleration normally permitted during the coasting; and
   controls the generated voltage of the generator so that the deceleration of the vehicle is not larger than the normal permissible deceleration when the recommended deceleration is not larger than the conditioned permissible deceleration.

3. The regeneration control device for the vehicle according to claim 1, wherein the regeneration control unit:
   operates the load response control when the recommended deceleration is not larger than the normal permissible deceleration and in excess of a regeneration prohibiting deceleration smaller than the normal permissible deceleration.

4. The regeneration control device for the vehicle according to claim 3, comprising a regeneration control prohibition unit configured to prohibit the regeneration control when the recommended deceleration is smaller than the regeneration prohibiting deceleration.

5. A regeneration control device for vehicle including:
   a generator to be driven by an engine, and
   a transmission capable of continuously varying a speed ratio, and configured to convert kinetic energy of a vehicle into electrical energy by the generator, comprising:
   a generated voltage control unit configured to variably control a generated voltage of the generator;
   a road traffic environment detection unit configured to detect a road traffic environment;
   a recommended deceleration calculation unit configured to calculate a recommended deceleration during coasting depending on the road traffic environment; and
   a regeneration control unit configured to convert the kinetic energy of the vehicle into the electrical energy by increasing the generated voltage of the generator as the recommended deceleration increases;
   wherein the regeneration control unit operates a load response control for gradually increasing the generated voltage of the generator when an engine rotation speed is not higher than a predetermined rotation speed if the recommended deceleration is not larger than a normal permissible deceleration normally permitted during coasting and maintains the engine rotation speed at a rotation speed higher than the predetermined rotation speed by increasing the speed ratio of the transmission so that the load response control function does not operate when the recommended deceleration is larger than the normal permissible deceleration.

* * * * *